(12) United States Patent
Koehnle et al.

(10) Patent No.: US 6,773,474 B2
(45) Date of Patent: Aug. 10, 2004

(54) COATED ABRASIVE ARTICLE

(75) Inventors: Gregory A. Koehnle, Oakdale, MN (US); Edward J. Woo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 50 days.

(21) Appl. No.: 10/125,938

(22) Filed: Apr. 19, 2002

(65) Prior Publication Data

US 2003/0200701 A1 Oct. 30, 2003

(51) Int. Cl.$^7$ .............................. B24D 3/00; B24D 11/00
(52) U.S. Cl. .......................... 51/298; 51/293; 51/295; 51/307; 51/308; 51/309; 451/28
(58) Field of Search ........................ 51/307, 308, 309, 51/295, 297, 293, 298; 451/28

(56) References Cited

U.S. PATENT DOCUMENTS

| | | |
|---|---|---|
| 3,879,312 A | 4/1975 | Udding et al. |
| 4,047,903 A | 9/1977 | Hesse et al. |
| 4,250,053 A | 2/1981 | Smith |
| 4,256,828 A | 3/1981 | Smith |
| 4,314,827 A | 2/1982 | Leitheiser et al. |
| 4,518,397 A | 5/1985 | Leitheiser et al. |
| 4,623,364 A | 11/1986 | Cottringer et al. |
| 4,642,126 A | 2/1987 | Zador et al. |
| 4,652,274 A | 3/1987 | Boettcher et al. |
| 4,652,275 A | 3/1987 | Bloecher et al. |
| 4,744,802 A | 5/1988 | Schwabel |
| 4,751,138 A | 6/1988 | Tumey et al. |
| 4,770,671 A | 9/1988 | Monroe et al. |
| 4,799,939 A | 1/1989 | Bloecher et al. |
| 4,836,832 A | 6/1989 | Tumey et al. |
| 4,881,951 A | 11/1989 | Wood et al. |
| 4,904,814 A | 2/1990 | Frei et al. |
| 4,980,492 A | 12/1990 | Dektar et al. |
| 4,997,717 A | 3/1991 | Rembold et al. |
| 5,011,508 A | 4/1991 | Wald et al. |
| 5,059,701 A | 10/1991 | Keipert |
| 5,070,161 A | 12/1991 | Nakano et al. |
| 5,078,753 A | 1/1992 | Broberg et al. |
| 5,090,968 A | 2/1992 | Pellow |
| 5,108,463 A | 4/1992 | Buchanan |
| 5,124,417 A | 6/1992 | Farooq |
| 5,132,377 A | 7/1992 | Nakano et al. |
| 5,134,191 A | 7/1992 | Takarada et al. |
| 5,137,542 A | 8/1992 | Buchanan et al. |
| 5,139,978 A | 8/1992 | Wood |
| 5,191,101 A | 3/1993 | Palazotto et al. |
| 5,201,916 A | 4/1993 | Berg et al. |
| 5,203,884 A | 4/1993 | Buchanan et al. |
| 5,227,104 A | 7/1993 | Bauer |
| 5,252,694 A | 10/1993 | Willett et al. |
| 5,328,716 A | 7/1994 | Buchanan |
| 5,362,421 A | 11/1994 | Kropp et al. |
| 5,366,523 A | 11/1994 | Rowenhorst et al. |
| 5,378,251 A | 1/1995 | Culler et al. |
| 5,417,726 A | 5/1995 | Stout et al. |
| 5,429,647 A | 7/1995 | Larmie |
| 5,436,063 A | 7/1995 | Follett et al. |
| 5,453,450 A | 9/1995 | Kinzer et al. |
| 5,494,943 A | 2/1996 | Mahoney et al. |
| 5,498,269 A | 3/1996 | Larmie |

(List continued on next page.)

FOREIGN PATENT DOCUMENTS

| | | |
|---|---|---|
| EP | 0 284 062 A2 | 9/1988 |
| EP | 0 285 369 A2 | 10/1988 |
| EP | 0 343 690 B1 | 2/1995 |
| EP | 1 087 262 A2 | 3/2001 |
| JP | 4-261421 | 9/1992 |
| JP | 2001-66779 A | 3/2001 |
| WO | WO 96/38263 | 12/1996 |
| WO | WO 97/31079 | 8/1997 |
| WO | WO 98/10896 | 3/1998 |
| WO | WO 98/32566 | 7/1998 |
| WO | WO 00/38886 | 7/2000 |

OTHER PUBLICATIONS

U.S. patent application Ser. No. 09/812,174, filed Mar. 20, 2001, Abrasive Articles Having a Polymeric Material.
U.S. patent application Ser. No. 10/100,693, filed Mar. 18, 2002, Coated Abrasive Article.

Primary Examiner—Michael Marcheschi
(74) Attorney, Agent, or Firm—Bradford B. Wright

(57) ABSTRACT

Coated abrasive articles comprise a backing and an abrasive layer, and optionally at least one of a backsize layer, tie layer, supersize layer, presize layer, or saturant. The coated abrasive article comprises a reaction product of components comprising:

polyfunctional acrylate;
polyfunctional cationically polymerizable material;
free radical photoinitiator;
triarylsulfonium salt having the formula

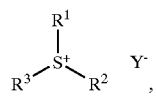

wherein $R^1$, $R^2$ and $R^3$ independently represent an, optionally substituted, aromatic group having from about 4 to about 20 carbon atoms, and $Y^-$ represents a non-interfering anion; and
quaternary ammonium salt having the formula

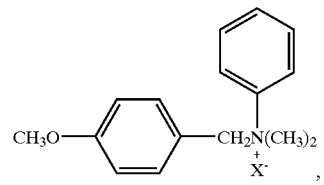

wherein $X^-$ is a non-interfering anion.

49 Claims, 1 Drawing Sheet

U.S. PATENT DOCUMENTS

| | | |
|---|---|---|
| 5,505,747 A | 4/1996 | Chesley et al. |
| 5,549,962 A | 8/1996 | Holmes et al. |
| 5,551,963 A | 9/1996 | Larmie |
| 5,552,225 A | 9/1996 | Ho |
| 5,556,437 A | 9/1996 | Lee et al. |
| 5,560,753 A | 10/1996 | Schnabel et al. |
| 5,565,011 A | 10/1996 | Follett et al. |
| 5,573,619 A | 11/1996 | Benedict et al. |
| 5,582,625 A | 12/1996 | Wright et al. |
| 5,599,622 A | 2/1997 | Kinzer et al. |
| 5,610,443 A | 3/1997 | Inagaki et al. |
| 5,672,186 A | 9/1997 | Chesley et al. |
| 5,672,637 A | 9/1997 | Mahoney et al. |
| 5,700,302 A | 12/1997 | Stoetzel et al. |
| 5,709,948 A | 1/1998 | Perez et al. |
| 5,766,277 A | 6/1998 | DeVoe et al. |
| 5,863,847 A | 1/1999 | DeVoe et al. |
| 5,922,784 A | 7/1999 | DeVoe et al. |
| 5,942,015 A | 8/1999 | Culler et al. |
| 6,077,601 A | 6/2000 | DeVoe et al. |
| 6,133,335 A | 10/2000 | Mahoney et al. |
| 6,258,138 B1 | 7/2001 | DeVoe et al. |
| 6,291,059 B1 | 9/2001 | Mahoney et al. |

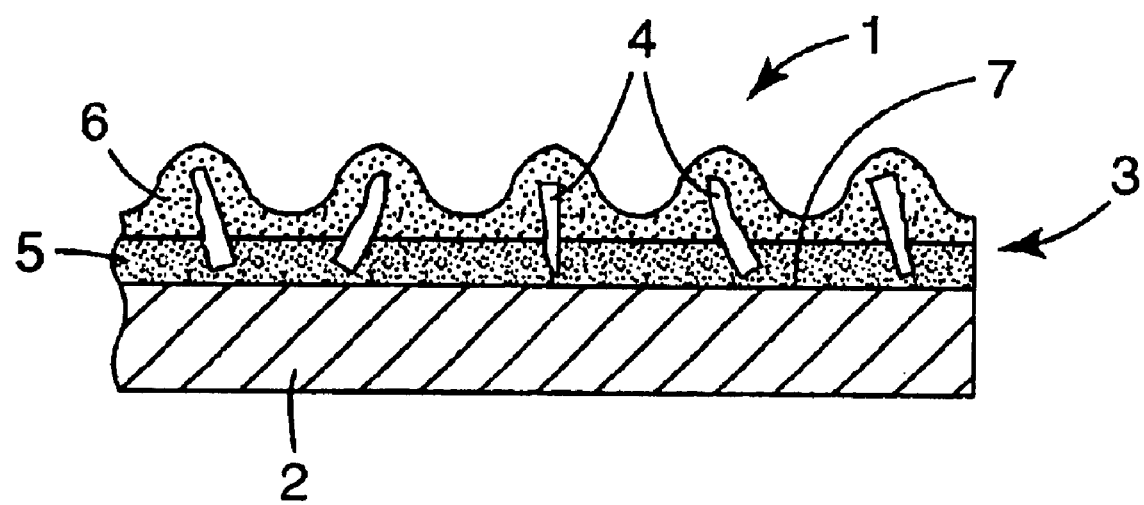

US 6,773,474 B2

COATED ABRASIVE ARTICLE

TECHNICAL FIELD

The present invention relates to coated abrasive articles and to methods of making and using the same.

BACKGROUND OF THE INVENTION

In general, coated abrasive articles have abrasive particles secured to a backing. More typically, coated abrasive articles comprise a backing having two major opposed surfaces and an abrasive layer secured to a major surface. The abrasive layer is typically comprised of abrasive particles and a binder, wherein the binder serves to secure the abrasive particles to the backing.

One common type of coated abrasive article has an abrasive layer which comprises a make layer, a size layer, and abrasive particles. In making such a coated abrasive article, a make layer comprising a first binder precursor is applied to a major surface of the backing. Abrasive particles are then at least partially embedded into the make layer (e.g., by electrostatic coating), and the first binder precursor is cured (i.e., crosslinked) to secure the particles to the make layer. A size layer comprising a second binder precursor is then applied over the make layer and abrasive particles, followed by curing of the binder precursors.

Another common type of coated abrasive article comprises an abrasive layer secured to a major surface of a backing, wherein the abrasive layer is provided by applying a slurry comprised of binder precursor and abrasive particles onto a major surface of a backing, and then curing the binder precursor.

Optionally, coated abrasive articles may further comprise, for example, a backsize layer (i.e., a coating on the major surface of the backing opposite the major surface having the abrasive layer), a presize layer or a tie layer (i.e., a coating between the abrasive layer and the major surface to which the abrasive layer is secured), and/or a saturant which coats both major surfaces of the backing. In another aspect, coated abrasive articles may further comprise a supersize layer covering the abrasive layer. The supersize layer typically includes grinding aids and/or anti-loading materials.

Typically, binder precursors include one or more catalyst(s), initiator(s) and/or curing agent(s) (i.e., collectively referred to as curative) that facilitates curing of the binder precursor by thermal and/or radiation curing methods. The degree of cure of binder precursor (and resulting abrasive properties of the coated abrasive article) typically depends, in part, on the composition of the curative. Generally, radiation curing methods provide rapid curing of binder precursors, but are inhibited by opaque materials such as abrasive particles and/or fillers that block incident radiation (e.g., by shadowing). Binder precursors in make, size, and/or slurry layers of the abrasive layer, and optionally in supersize, backsize, presize, and/or tie layers, and/or saturant are prone to such shadowing. Thermal methods for curing binder precursors are generally not inhibited by shadowing, but are typically slower than radiation curing methods.

A variety of abrasive properties may be associated with coated abrasive articles. One important abrasive property is "stiction". Stiction refers to the force necessary to slide the coated abrasive article against a workpiece during use. Many users of coated abrasive articles consider high stiction aesthetically desirable, associating high stiction with other desirable abrasive performance parameters (e.g., high rate of cut).

There continues to be a need for binder precursors that are useful for making coated abrasive articles, that cure rapidly in the presence of shadowing, have acceptable pot life, and result in coated abrasive articles having improved abrasive properties such as stiction.

SUMMARY OF THE PRESENT INVENTION

In one aspect, the present invention provides a coated abrasive article comprising:
  a backing having a major surface;
  an abrasive layer secured to at least a portion of the major surface, the abrasive layer comprising a binder and abrasive particles; and
  reaction product of components comprising:
    polyfunctional acrylate;
    polyfunctional cationically polymerizable material; and
    ternary curative,
  wherein, optionally, the binder comprises at least a portion of the reaction product.

In another aspect, the present invention provides a method for making a coated abrasive article comprising:
  providing a backing having a major surface;
  applying a make layer comprising a first binder precursor onto at least a portion of the major surface of the backing;
  at least partially embedding a plurality of abrasive particles into the make layer;
  curing the first binder precursor;
  applying a size layer comprising a second binder precursor onto at least a portion of the make layer and plurality of abrasive particles; and
  curing the second binder precursor to provide a coated abrasive article,
  wherein said method includes incorporating a reaction product of components comprising:
    polyfunctional acrylate;
    polyfunctional cationically polymerizable material; and
    ternary curative,
into said coated abrasive article, and wherein, optionally, at least one of the first or second binder comprises at least a portion of the reaction product.

In another aspect, the present invention provides a method for making a coated abrasive article comprising:
  providing a backing having a major surface;
  applying a slurry comprising a binder precursor and abrasive particles onto at least a portion of the major surface of the backing; and
  curing the binder precursor to provide a coated abrasive article,
  wherein said method includes incorporating a reaction product of components comprising:
    polyfunctional acrylate;
    polyfunctional cationically polymerizable material; and
    ternary curative,
into said coated abrasive article, and wherein, optionally, the cured binder precursor comprises at least a portion of the reaction product.

In another aspect, the present invention provides a method of abrading a workpiece comprising:
  providing a coated abrasive article according to the present invention;

frictionally contacting at least a portion of the abrasive layer with at least a portion of the surface of the workpiece; and moving at least one of the coated abrasive article or the workpiece relative to the other to abrade at least a portion of the surface.

Coated abrasive articles according to the present invention are conveniently prepared and typically exhibit one or more improved abrasive properties (e.g., stiction).

As used herein:

"acrylate" includes both acrylate and methacrylate;

"acryloxy" includes both acryloxy and methacryloxy;

"actinic radiation" means particulate and non-particulate radiation and includes electron beam radiation as well as electromagnetic radiation having at least one wavelength in the range of from about 200 nanometers (nm) to about 700 nm;

"average acrylate functionality" refers to the average number of acryloxy groups per molecule; it is determined for a specified material by dividing the total number of acryloxy groups by the total number of molecules having acryloxy groups;

"average cationically polymerizable group functionality" refers to the average number of cationically polymerizable groups per molecule; it is determined for a specified material by dividing the total number of cationically polymerizable groups by the total number of molecules having cationically polymerizable groups;

"bireactive compounds" are those which contain at least one ethylenically-unsaturated group and at least one 1,2-epoxide group;

"crosslinked" means having polymeric sections that are interconnected through chemical bonds (i.e., interchain links) to form a three-dimensional molecular network;

"epoxy resin" refers to a material containing molecules having at least one epoxy group;

"epoxy group" refers to an oxiranyl group;

"oligomer" refers to a polymer molecule having 2 to 10 repeating units (e.g., dimer, trimer, tetramer, and so forth) having an inherent capability of forming chemical bonds with the same or other oligomers in such manner that longer polymeric chains can be formed therefrom;

"photoinitiator" refers to a substance, which, if exposed to electromagnetic radiation having at least one wavelength in the range of from about 200 nm to about 700 nm, forms an initiator for free radical polymerization;

"polyfunctional acrylate" refers to a material having an average acrylate functionality of at least 2;

"ternary curative" refers to a combination of components comprising:
free radical photoinitiator;
triarylsulfonium salt having the formula

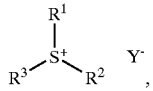

wherein $R^1$, $R^2$ and $R^3$ independently represent an, optionally substituted, aromatic group having from about 4 to about 20 carbon atoms, and $Y^-$ represents a non-interfering anion; and quaternary ammonium salt having the formula

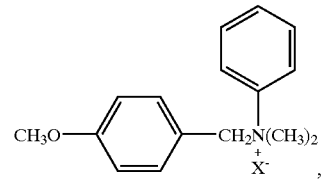

wherein $X^-$ is a non-interfering anion.

BRIEF DESCRIPTION OF THE DRAWING

The drawing is a cross-sectional view of a section of an exemplary coated abrasive.

DETAILED DESCRIPTION

An exemplary coated abrasive article according to the present invention is illustrated in the drawing. Referring to the drawing, coated abrasive article 1 has backing 2 and abrasive layer 3. Abrasive layer 3, in turn, includes abrasive particles 4 secured to major surface 7 of backing 2 by make layer 5 and size layer 6.

Suitable backings for coated abrasive articles according to the present invention include those known in the art for making coated abrasive articles, including conventional sealed coated abrasive backings and porous non-sealed backings. The thickness of the backing generally ranges from about 0.02 to about 5 millimeters, desirably from about 0.05 to about 2.5 millimeters, and more desirably from about 0.1 to about 0.4 millimeter, although thicknesses outside of these ranges may also be useful.

The backing may be flexible or rigid. Desirably the backing is flexible. The backing may be made of any number of various materials including those conventionally used as backings in the manufacture of coated abrasives.

Exemplary flexible backings include polymeric film (including primed films) such as polyolefin film (e.g., polypropylene including biaxially oriented polypropylene, polyester film, polyamide film, cellulose ester film), metal foil, mesh, foam (e.g., natural sponge material or polyurethane foam), cloth (e.g., cloth made from fibers or yarns comprising polyester, nylon, silk, cotton, and/or rayon), paper, coated paper, vulcanized paper, vulcanized fiber, nonwoven materials, combinations thereof, and treated versions thereof. The backing may also be a laminate of two materials (e.g., paper/film, cloth/paper, film/cloth). Cloth backings may be woven or stitch bonded.

The choice of backing material may depend, for example, on the intended application of the coated abrasive article. The thickness and smoothness of the backing should also be suitable to provide the desired thickness and smoothness of the coated abrasive article, wherein such characteristics of the coated abrasive article may vary depending, for example, on the intended application or use of the coated abrasive article.

The backing may, optionally, have at least one of a saturant, a presize layer and/or a backsize layer. The purpose of these materials is typically to seal the backing and/or to protect yarn or fibers in the backing. If the backing is a cloth material, at least one of these materials is typically used. The addition of the presize layer or backsize layer may additionally result in a "smoother" surface on either the front and/or the back side of the backing. Other optional layers known in the art may also be used (e.g., tie layer; see, e.g., U.S. Pat.

No. 5,700,302 (Stoetzel et al.), the disclosure of which is incorporated by reference).

An antistatic material may be included in any of these cloth treatment materials. The addition of an antistatic material can reduce the tendency of the coated abrasive article to accumulate static electricity when sanding wood or wood-like materials. Additional details regarding antistatic backings and backing treatments can be found in, for example, U.S. Pat. Nos. 5,108,463 (Buchanan et al.); 5,137,542 (Buchanan et al.); 5,328,716 (Buchanan); and 5,560,753 (Buchanan et al.), the disclosures of which are incorporated herein by reference.

The backing may be a fibrous reinforced thermoplastic such as described, for example, as described, for example, in U.S. Pat. No. 5,417,726 (Stout et al.), or an endless spliceless belt, as described, for example, in U.S. Pat. No. 5,573,619 (Benedict et al.), the disclosures of which are incorporated herein by reference. Likewise, the backing may be a polymeric substrate having hooking stems projecting therefrom such as that described, for example, in U.S. Pat. No. 5,505,747 (Chesley et al.), the disclosure of which is incorporated herein by reference. Similarly, the backing may be a loop fabric such as that described, for example, in U.S. Pat. No. 5,565,011 (Follett et al.), the disclosure of which is incorporated herein by reference.

In some instances, it may be desirable to incorporate a pressure-sensitive adhesive onto the back side of the coated abrasive article such that the resulting coated abrasive article can be secured to a back up pad. Exemplary pressure-sensitive adhesives include latex crepe, rosin, acrylic polymers, and copolymers including polyacrylate esters (e.g., poly(butyl acrylate)), vinyl ethers (e.g., poly(vinyl n-butyl ether)), alkyd adhesives, rubber adhesives (e.g., natural rubber, synthetic rubber, chlorinated rubber), and mixtures thereof.

Exemplary rigid backings include metal plates, ceramic plates, and the like. Another example of a suitable rigid backing is described, for example, in U.S. Pat. No. 5,417,726 (Stout et al.), the disclosure of which is incorporated herein by reference.

To promote adhesion of the make layer, slurry layer, and/or optional backsize layer, it may be necessary to modify the surface to which these layers are applied. Exemplary surface modifications include corona discharge, ultraviolet light exposure, electron beam exposure, flame discharge, and/or scuffing.

In some embodiments of the present invention, the abrasive layer comprises make and size layers. The make or the size layers may be of any composition (e.g., phenolic, epoxy/acrylate), but desirably at least one of the make or size layer, comprises a reaction product of components comprising polyfunctional acrylate, polyfunctional cationically polymerizable material, and ternary curative.

Desirably, both the make and size layers comprise reaction product of binder precursor comprising polyfunctional acrylate, polyfunctional cationically polymerizable material, and ternary curative. The binder precursor is cured to form a binder using the methods described hereinbelow.

In some embodiments, the binder precursor comprising the make layer is desirably a hot melt adhesive as described in, for example, U.S. Pat. No. 5,436,063 (Follet et al.), the disclosure of which is incorporated herein by reference. In such embodiments, the binder precursor is typically applied to the backing as a liquid material. Abrasive particles are at least partially embedded into the liquid binder precursor which is then cured thereby fixing the abrasive particles to the make layer. A size layer, for example, a size layer comprising reaction product of binder precursor comprising polyfunctional acrylate, polyfunctional cationically polymerizable material, and ternary curative, is then applied over the make layer and abrasive particles and cured.

Exemplary useful make and size layers typically comprise a binder resin such as a glue or a phenolic resin, aminoplast resin, urea-formaldehyde resin, melamine-formaldehyde resin, urethane resin, (e.g., an aminoplast resin having pendant $\alpha,\beta$-unsaturated groups, acrylated urethane, acrylated epoxy, acrylated isocyanurate), acrylic resin, epoxy resin (including bis-maleimide and fluorene-modified epoxy resins), isocyanurate resin, as well as mixtures thereof.

The basis weight of the make layer utilized may depend, for example, on the intended use(s), type(s) of abrasive particles, and nature of the coated abrasive article being prepared, but generally will be in the range of from about 1 to about 30 grams per square meter (i.e., $g/m^2$), desirably from about 2 to about 25 $g/m^2$, and more desirably from about 5 to about 20 $g/m^2$. The make layer may be applied by any known coating method for applying a make layer to a backing, including roll coating, extrusion die coating, curtain coating, knife coating, gravure coating, spray coating, and the like.

The basis weight of the size layer will also necessarily vary depending on the intended use(s), type(s) of abrasive particles, and nature of the coated abrasive article being prepared, but generally will be in the range of from about 1 to about 400 $g/m^2$, desirably from about 1 to about 300 $g/m^2$, and more desirably from about 5 to about 300 $g/m^2$. The size layer may be applied by any known coating method for applying a size layer to a backing, including roll coating, extrusion die coating, curtain coating, spray coating, and the like.

In some embodiments of coated abrasive articles according to the present invention, the abrasive layer comprises a slurry layer comprising abrasive particles and binder that is the reaction product of components comprising polyfunctional acrylate, polyfunctional cationically polymerizable material, and ternary curative. Slurry coating techniques are well known in the abrasive art, and include those described, for example, in U.S. Pat. Nos. 5,378,251 (Culler et al.) and 5,942,015 (Culler et al.), the disclosures of which are incorporated herein by reference.

Polyfunctional acrylate that may be utilized in practice of the present invention includes acrylate monomers, acrylate oligomers, acrylated polymers, and mixtures thereof.

The amount of polyfunctional acrylate present in binder precursors for uncured make layers, size layers, and/or slurry layers utilized in the present invention typically ranges from about 1 to about 90 percent by weight, desirably from about 4 to about 50 percent by weight, and even more desirably from about 5 to about 30 percent by weight, based on the total combined weight of polyfunctional acrylate and polyfunctional cationically polymerizable material, although amounts outside these ranges may also be useful.

A wide variety of acrylate monomers, acrylate oligomers, and acrylated polymers are readily commercially available, for example, from such vendors as Sartomer Co., Exton, Pa., and UCB Chemicals Corp., Smyrna, Ga. Exemplary acrylate monomers include ethylene glycol diacrylate and methacrylate, hexanediol diacrylate, triethylene glycol diacrylate and methacrylate, trimethylolpropane triacrylate, glycerol triacrylate, pentaerythritol triacrylate and methacrylate, ethoxylated trimethylolpropane triacrylate and trimethacrylate, neopentyl glycol diacrylate and dimethacrylate, pentaerythritol tetraacrylate and tetramethacrylate, dipentaerythritol pentaacrylate, sorbitol triacrylate, sorbitol hexaacrylate, Bisphenol A diacrylate, ethoxylated Bisphenol A diacrylate, and mixtures thereof.

Exemplary useful acrylate monomers include trimethylolpropane triacrylate, available, for example, from Sartomer Co. under the trade designation "SR 351"; ethoxylated trimethylolpropane triacrylate, available, for example, from Sartomer Co. under the trade designation "SR 454"; pentaerythritol tetraacrylate, available, for example, from Sartomer Co. under the trade designation "SR 295"; and neopentyl glycol diacrylate, available, for example, from Sartomer Co. under the trade designation "SR 247".

Desirably, polyfunctional acrylate comprises an acrylate oligomer. Exemplary acrylate oligomers include acrylated epoxy oligomers (e.g., Bisphenol-A based epoxy acrylate oligomers), aliphatic urethane acrylate oligomers, and aromatic urethane acrylate oligomers. Additional useful polyfunctional acrylate oligomers include polyether oligomers such as a polyethylene glycol 200 diacrylate, available, for example, from Sartomer Co. under the trade designation "SR 259" and a polyethylene glycol 400 diacrylate, available, for example, from Sartomer Co. under the trade designation "SR 344"; and acrylated epoxies including those available, for example, under the trade designations "EBECRYL 3500", "EBECRYL 3600", and "EBECRYL 3700", from UCB Chemicals Corp. Desirably the acrylate oligomer is an acrylated epoxy oligomer.

Polyfunctional acrylate may comprise a blend of two or more polymerizable acrylates. If used, such blends typically comprise a plurality of various polyfunctional acrylate monomers, acrylate oligomers, and/or acrylated polymers; in some instances, such as to adjust viscosity of the binder precursor or physical properties of the cured binder, it may be desirable to include one or more monofunctional acrylate monomers in the polyfunctional acrylate. Desirably, polyfunctional acrylate, whether present as a blend of polymerizable acrylate materials or as a single component, has an average acrylate functionality of at least 2, desirably at least 2.5, more desirably at least 3.

Polyfunctional cationically polymerizable materials, useful in practice of the present invention, may be a single compound, or mixture of compounds, having one or more cationically polymerizable materials comprising individual molecules having a plurality of cationically polymerizable groups.

Desirably, cationically polymerizable materials, whether present as a blend of cationically polymerizable materials or as a single component, has an average cationically polymerizable group (e.g., epoxy, ethenoxy) functionality of at least 2, desirably at least 2.5, more desirably at least 3.

Exemplary polyfunctional cationically polymerizable materials include polyepoxides and polyfunctional vinyl ethers (i.e., having two or more ethenoxy groups per molecule). Desirably, the polyfunctional cationically polymerizable material comprises polyepoxide.

The amount of polyfunctional cationically polymerizable material present in binder precursors for make layers, size layers, and/or slurry layers utilized in the present invention typically ranges from about 10 to about 99 percent by weight, desirably from about 50 to about 96 percent by weight, more desirably from about 70 to about 95 percent by weight, based on the total combined weight of polyfunctional acrylate and polyfunctional cationically polymerizable material, although amounts outside these ranges may also be useful.

Polyepoxides that may be utilized in practice of the present invention include monomeric polyepoxides, oligomeric polyepoxides, polymeric polyepoxides, and mixtures thereof. Polyepoxide may include aromatic and/or aliphatic polyepoxides.

Exemplary commercially available alicyclic polyepoxides monomers, useful in practice of the present invention, include epoxycyclohexanecarboxylates (e.g., 3,4-epoxycyclohexylmethyl 3,4-epoxycyclohexanecarboxylate (available, for example, under the trade designation "ERL-4221" from Dow Chemical Co., Midland, Mich.), 3,4-epoxy-2-methylcyclohexylmethyl 3,4-epoxy-2-methylcyclohexanecarboxylate, bis(3,4-epoxy-6-methylcyclohexylmethyl) adipate, 3,4-epoxy-6-methylcyclohexylmethyl 3,4-epoxy-6-methylcyclohexanecarboxylate (available, for example, under the trade designation "ERL-4201" from Dow Chemical Co.); vinylcyclohexene dioxide (available, for example, under the trade designation "ERL-4206" from Dow Chemical Co.); bis(2,3-epoxycyclopentyl) ether (available, for example, under the trade designation "ERL-0400" from Dow Chemical Co.), bis(3,4-epoxy-6-methylcyclohexylmethyl)adipate (available, for example, under the trade designation "ERL-4289" from Dow Chemical Co.), dipenteric dioxide (available, for example, under the trade designation "ERL-4269" from Dow Chemical Co.), 2-(3,4-epoxycyclohexyl-5,1'-spiro-3',4'-epoxycyclohexane-1,3-dioxane, and 2,2-bis(3,4-epoxycyclohexyl)propane. 3,4-Epoxycyclohexylmethyl 3,4-epoxycyclohexanecarboxylate is an especially desirable polyepoxide.

Aromatic polyepoxides that may be utilized in practice of the present invention include monomeric aromatic polyepoxides, oligomeric aromatic polyepoxides, polymeric aromatic polyepoxides, and mixtures thereof.

Exemplary aromatic polyepoxides, useful in practice of the present invention, include polyglycidyl ethers of polyhydric phenols such as: Bisphenol A-type resins and their derivatives, including such epoxy resins having the trade designation "EPON" (e.g., "EPON 828" and "EPON 1001F"), available, for example, from Resolution Performance Products, Houston, Tex.; epoxy cresol-novolac resins; Bisphenol-F resins and their derivatives; epoxy phenol-novolac resins; and glycidyl esters of aromatic carboxylic acids (e.g., phthalic acid diglycidyl ester, isophthalic acid diglycidyl ester, trimellitic acid triglycidyl ester, and pyromellitic acid tetraglycidyl ester), and mixtures thereof.

Exemplary commercially available aromatic polyepoxides include those having the trade designation "ARALDITE" (e.g., "ARALDITE MY-720", "ARALDITE 721", "ARALDITE 722", "ARALDITE 0510", "ARALDITE 0500", "ARALDITE PY-306", and "ARALDITE 307"), available from Ciba Specialty Chemicals, Tarrytown, N.Y.; aromatic polyepoxides having the trade designation "EPON" (e.g., "EPON DPL-862" and "EPON HPT-1079"), available from Resolution Performance Products; and aromatic polyepoxides having the trade designations "DER", "DEN" (e.g., "DEN 438", and "DEN 439"), and "QUATREX", available from Dow Chemical Co.

Desirable aromatic polyepoxides include polyglycidyl ethers of a polyhydric phenol, more desirably a diglycidyl ether of Bisphenol A.

Exemplary vinyl ethers that can be used in the present invention include polyfunctional vinyl ethers of polyols (e.g., ethylene glycol divinyl ether, 1,4-butanediol divinyl ether, 1,3-dihydroxybutane divinyl ether, 1,4- cyclohexanedimethanol divinyl ether, triethylene glycol divinyl ether, pentaerythritol trivinyl ether, and divinyl ethers of polyethers or polyester diols and divinyl ethers of urethanes or diisocyanates). Polyfunctional vinyl ethers may be blended with monofunctional vinyl ethers.

Commercially available vinyl ethers include those having the trade designations "RAPI-CURE" (e.g., "RAPI-CURE CHVE", "RAPI-CURE CVE", "RAPI-CURE DDVE", "RAPI-CURE DVE-3", "RAPI-CURE PEPC"), available from International Specialty Products, Wayne, N.J.; and "VECTOMER" (e.g., "VECTOMER VE 4010", "VECTOMER VE 4051", "VECTOMER VE 4230", "VECTOMER VE 1312", "VECTOMER VE 5015"), available from Morflex, Greensboro, N.C.

Optionally, a hydroxy-containing material may be present in binder precursors for make layers, size layers, slurry layers and/or additional layers utilized in the present invention. Exemplary hydroxy-containing materials include those described, for example, in U.S. Pat. No. 6,077,601 (DeVoe et al.), the disclosure of which is incorporated herein by reference.

Abrasive particles suitable for use in abrasive layers utilized in practice of the present invention include any abrasive particles known in the abrasive art. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Desirably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof. Examples of sol-gel abrasive particles include those described U.S. Pat. Nos. 4,314,827 (Leitheiser et al.); 4,518,397 (Leitheiser et al.); 4,623,364 (Cottringer et al.); 4,744,802 (Schwabel); 4,770,671 (Monroe et al.); 4,881,951 (Wood et al.); 5,011,508 (Wald et al.); 5,090,968 (Pellow); 5,139,978 (Wood); 5,201,916 (Berg et al.); 5,227,104 (Bauer); 5,366,523 (Rowenhorst et al.); 5,429,647 (Larmie); 5,498,269 (Larmie); and 5,551,963 (Larmie), the disclosures of which are incorporated herein by reference. The abrasive particles may be in the form of, for example, individual particles, agglomerates, abrasive composite particles, and mixtures thereof. Exemplary agglomerates are described, for example, in U.S. Pat. Nos. 4,652,275 (Bloecher et al.) and 4,799,939 (Bloecher et al.), the disclosures of which are incorporated herein by reference. It is also within the scope of the present invention to use diluent erodible agglomerate grains as described, for example, in U.S. Pat. No. 5,078,753 (Broberg et al.), the disclosure of which is incorporated herein by reference.

Abrasive composite particles comprise abrasive grains in a binder. Exemplary abrasive composite particles are described, for example, in U.S. Pat. No. 5,549,962 (Holmes et al.), the disclosure of which is incorporated herein by reference.

The abrasive particles typically have an average diameter of from about 0.1 to about 2000 micrometers, more desirably from about 1 to about 1300 micrometers. Coating weights for the abrasive particles may depend, for example, on the binder precursor used, the process for applying the abrasive particles, and the size of the abrasive particles, but typically range from about 5 to about 1,350 g/m$^2$.

The binder precursor may further comprise an optional bireactive polymerizable component, for example, a compound having at least one free radically polymerizable group, and at least one cationically polymerizable group. Bireactive compounds can be made, for example, by introducing at least one ethylenically-unsaturated group into a compound that already contains one or more epoxy groups, or, conversely, by introducing at least one epoxy group into a compound that already contains one or more ethylenically-unsaturated group.

Exemplary bireactive polymerizable compounds include those contained in the reaction products of 0.4 to 0.6 weight equivalent of an acrylic acid and one mole of diglycidyl ether of Bisphenol A, polyglycidyl ether of phenol-formaldehyde novolac, polyglycidyl ether of cresol-formaldehyde novolac, diglycidyl terephthalate, triglycidyl ester of trimellitic acid, dicyclopentadiene dioxide, vinylcyclohexene dioxide, bis(2,3-epoxycyclopentyl)ether, 3,4-epoxycyclohexylmethyl 3,4-epoxycyclohexanecarboxylate, and bis(3,4-epoxy-6-methylcyclohexyl)methyl adipate.

If used, optional bireactive materials are desirably selected such that they do not significantly inhibit the cure of cationically polymerizable resin. Exemplary groups that may interfere with such cure include, primary, secondary and tertiary amines, amides, imides, and the like.

Ternary curative is utilized, in practice of the present invention, to facilitate cure of at least one binder precursor.

Photoinitiators that are useful for the ternary curative include those known as useful for photocuring free radically polyfunctional acrylates. Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available, for example, under the trade designation "IRGACURE 651" from Ciba Specialty Chemicals), benzoin methyl ether, benzoin ethyl ether, benzoin n-butyl ether; acetophenone and its derivatives such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio)phenyl]-2-(4-morpholinyl)-1-propanone (available, for example, under the trade designation "IRGACURE 907" from Ciba Specialty Chemicals); 2-benzyl-2-(dimethlamino)-1-[4-(4-morpholinyl)phenyl]-1-butanone (available, for example, under the trade designation "IRGACURE 369" from Ciba Specialty Chemicals); titanium complexes such as bis($\eta_5$-2,4-cyclopentadien-1-yl)bis[2,6-difluoro-3-(1H-pyrrol-1-yl)phenyl]titanium (under the trade designation "CGI 784 DC", also available from Ciba Specialty Chemicals); and mono- and bis-acylphosphines (available, for example, from Ciba Specialty Chemicals under the trade designations "IRGACURE 1700", "IRGACURE 1800", "IRGACURE 1850", and "DAROCUR 4265"). 2-Hydroxy-2-methyl-1-phenyl-1-propanone is a desired photoinitiator.

Desirably, if an acylphosphine or acylphosphine oxide photoinitiator is utilized, it is combined with a photoinitiator (e.g., 2-hydroxy-2-methyl-1-phenyl-1-propanone) having a high extinction coefficient at one or more wavelengths of the actinic radiation. Such combination typically facilitates surface cure while maintaining low levels of costly photoinitiator.

Other useful photoinitiators include anthraquinones, such as anthraquinone, 2-ethylanthraquinone, 1-chloroanthraquinone, 1,4-dimethylanthraquinone, 1-methoxyanthraquinone, and the like; and benzophenone and its derivatives (e.g., phenoxybenzophenone, phenylbenzophenone).

Triarylsulfonium salts that are useful for the ternary curative include triarylsulfonium salts having the formula

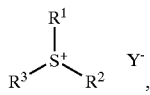

wherein
$R^1$, $R^2$ and $R^3$ independently represent an, optionally substituted, aromatic group (e.g., substituted or unsubstituted phenyl, thienyl, or furanyl) having from about 4 to about 20 carbon atoms. $R^1$, $R^2$ and/or $R^3$ may, optionally, have one or more fused rings (for example, naphthyl, benzothienyl, dibenzothienyl, benzofuranyl, dibenzofuranyl). Exemplary substituents that may be present, in any number or combination thereof, on aromatic groups $R^1$, $R^2$ and $R^3$ include, for example, alkyl having from 1 to 12 carbon atoms (e.g., for example, methyl, ethyl, dodecyl), alkoxy having from 1 to 12 carbon atoms (e.g., methoxy, ethoxy, ethoxyethoxy), halogen, aryl having from about 4 to about 16 carbon atoms (e.g., phenyl, furanyl), thioaryl having from 4 to 16 carbon atoms (e.g., thiophenyl), hydroxy, aroyl having from 4 to 16 carbon atoms (e.g., benzoyl, methoxybenzoyl).

$Y^-$ represents a non-interfering anion.

Non-interfering anions are those anions that do not substantially inhibit cationic polymerization. Desirably, non-interfering anions have the formula $DQ_n^-$, wherein D is a metal from Groups 8 to 11 or a metalloid from Groups 13 to 15 of the Periodic Table of the Elements (IUPAC version), Q is a halogen atom, and n is an integer having a value of from 1 to 6. Desirable metals are copper, zinc, titanium, vanadium, chromium, magnesium, manganese, iron, cobalt, or nickel. Desirable metalloids are desirably boron, aluminum, antimony, tin, arsenic and phosphorous. Desirably, Q is chlorine or fluorine. Exemplary non-interfering anions are $BF_4^-$, $PF_6^-$, $SbF_6^-$, $FeCl_4^-$, $SnCl_5^-$, $AsF_6^-$, $SbF_5OH^-$, $SbCl_6^-$, $SbF_5^{-2}$, $AlF_5^{-2}$, $GaCl_4^-$, $InF_4^-$, $TiF_6^{-2}$, $ZrF_6^{-2}$, and $CF_3SO_3^-$. Desirable non-interfering anions are $BF_4^-$, $PF_6^-$, $SbF_6^-$, $FeCl_4^-$, $SnCl_5^-$, $AsF_6^-$, $SbF_5OH^-$; more desirably, $PF_6^-$, $SbF_6^-$, $SbF_5OH^-$.

Triarylsulfonium salts can be prepared, for example, as described in U.S. Pat. Nos. 5,709,948 (Perez et al.) and 4,256,828 (Smith), the disclosures of which are incorporated herein by reference. Useful commercially available triarylsulfonium salts include an aromatic sulfonium complex salt, available, for example, under the trade designation "FX-512" from 3M Company, St. Paul, Minn.; an aromatic sulfonium complex salt having the trade designation "UVI-6974", available from Dow Chemical Co.; and triarylsulfonium salts having the trade designation "SARCAT" (e.g., "SARCAT CD 1010", "SARCAT CD 1011"), available from Sartomer Co.

Desirably, triarylsulfonium salt comprises triphenylsulfonium hexafluoroantimonate and/or p-phenyl(thiophenyl) diphenylsulfonium hexafluoroantimonate.

Triarylsulfonium salts, useful in practice of the present invention, are typically photosensitive only in the ultraviolet region (i.e., from about 200 nm to about 400 nm of the electromagnetic spectrum. However, they can be sensitized to the near ultraviolet and the visible range of the spectrum by sensitizers for known photolyzable organic halogen compounds. Exemplary sensitizers include aromatic amines and colored aromatic polycyclic hydrocarbons, as described, for example, in U.S. Pat. No. 4,250,053 (Smith), the disclosure of which is incorporated herein by reference.

Quaternary ammonium salts that are useful for the ternary curative have the formula

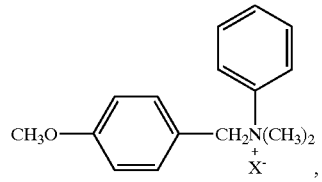

wherein $X^-$ is a non-interfering anion as defined above.

Quaternary ammonium salts of this type may be prepared by methods described in, for example, U.S. Pat. No. 5,070, 161 (Nakano et al.), the disclosure of which is incorporated herein by reference, or may be obtained from commercial sources (e.g., under the trade designation "NACURE XC-7231" from King Industries, Inc., Norwalk, Conn.). Analyses using infrared and nuclear magnetic resonance spectroscopy of the quaternary ammonium salt marketed under the trade designation "NACURE XC-7231" indicated that an especially desirable quaternary ammonium salt is (4-methoxybenzyl)dimethylphenylammonium hexafluoroantimonate.

Ternary curative can be present in an amount in the range of from about 0.01 to about 10 weight percent, desirably from about 0.01 to about 5 weight percent, most desirably 0.1 to about 3 weight percent, based on the total amount of photocurable (i.e., crosslinkable by electromagnetic radiation) components of the binder precursor, although amounts outside of these ranges may also be useful.

Photoinitiator, triarylsulfonium salt and quaternary ammonium salt of the ternary curative (as described above) may be present in any ratio. Typically, photoinitiator is present in the ternary curative in an amount of from about 5 to about 80 weight percent, desirably from about 20 to about 60 weight percent, more desirably from about 30 to about 50 weight percent based on the total weight of ternary curative present. Typically, triarylsulfonium salt is present in the ternary curative in an amount of from about 5 to about 80 weight percent, desirably from about 20 to about 60 weight percent, more desirably from about 30 to about 50 weight percent based on the total weight of ternary curative present. Typically, quaternary ammonium salt is present in the ternary curative in an amount of from about 5 to about 40 weight percent, desirably from about 10 to about 40 weight percent, more desirably from about 15 to about 30 weight percent based on the total weight of ternary curative present.

In addition to other components, binder precursors, if present, in the various layers (e.g., make, size, slurry, supersize, backsize, presize, and/or tie layers, and/or saturant) of coated abrasive articles according to the present invention may optionally contain catalysts (e.g., thermally activated catalysts or photocatalysts), free-radical initiators (e.g., thermal initiators or photoinitiators), curing agents to facilitate cure. Such catalysts (e.g., thermally activated catalysts or photocatalysts), free-radical initiators (e.g., thermal initiators or photoinitiators), and/or curing agents may be of any type known for use in coated abrasive articles including, for example, those described herein.

In addition to other components, the various layers, especially make, size, and/or slurry layers of coated abrasive articles according to the present invention may contain optional additives, for example, to modify performance and/or appearance. Exemplary additives include grinding aids, fillers, plasticizers, wetting agents, surfactants, pigments, coupling agents, fibers, lubricants, thixotropic materials, antistatic agents, suspending agents, pigments, and/or dyes. Exemplary antistatic agents include electrically conductive material such as vanadium pentoxide (e.g., dispersed in a sulfonated polyester), carbon black and/or graphite in a binder (see, e.g., U.S. Pat. Nos. 5,108,463 (Buchanan); 5,137,542 (Buchanan et al.); and 5,203,884 (Buchanan et al.), the disclosures of which are incorporated herein by reference).

Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium; and the like. Examples of other grinding aids include sulfur, organic sulfur compounds, graphite, and metallic sulfides. A combination of different grinding aids can be used such as that described, for example, in U.S. Pat. No. 5,552,225 (Ho), the disclosure of which is incorporated herein by reference.

Exemplary antistatic agents include graphite, carbon black, vanadium oxide, humectants, and the like.

Examples of useful fillers for this invention include silica such as quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite. Desired fillers are feldspar and quartz.

It is also within the scope of the present invention to have additional coatings (e.g., saturant, backsize layer, presize layer, tie layer, supersize layer), which may, for example, be present as continuous or discontinuous layers as dictated by the function or purpose of the material as known to one skilled in the art, and which may optionally, comprise the reaction product of binder precursor and ternary curative. For example, it may be desirable to provide a saturation coat to smooth the inherent textured surface of the paper backing material, particularly if utilizing fine grades of abrasive (e.g., ANSI grade 400 or finer). A backsize layer, which is applied to the back side of the backing, that is, the side opposite to which the abrasive particles are applied, adds body to the backing material and protects the backing material from wear. A presize layer is similar to a saturation coat except that it is applied to a previously treated backing. A supersize layer, that is, a coating applied on at least a portion of the size layer, can be added to provide, for example, a grinding aid, and/or as an anti-loading coating.

Further, with regard to the optional supersize layer, it may serve to prevent or reduce the accumulation of swarf (the material abraded from a workpiece) between abrasive particles, which can dramatically reduce the cutting ability of the coated abrasive article. Useful supersize layers desirably include a grinding aid (e.g., potassium tetrafluoroborate), metal salts of fatty acids (e.g., zinc stearate or calcium stearate), salts of phosphate esters (e.g., potassium behenyl phosphate), phosphate esters, urea-formaldehyde resins, mineral oils, crosslinked silanes, crosslinked silicones, and/or fluorochemicals. Useful supersize materials are further described, for example, in U.S. Pat. No. 5,556,437 (Lee et al.), the disclosure of which is incorporated herein by reference.

An optional backsize layer may, for example, include a binder containing dispersed filler particles, and/or a pressure-sensitive adhesive.

Methods for making coated abrasive articles are well known in the art.

In one method, coated abrasive articles according to the present invention can be made by applying a make layer comprising a first binder precursor onto at least a portion of a major surface of a backing. Abrasive particles are then applied to the make layer (e.g., by drop coating and/or electrostatic coating). The abrasive particles can be applied or placed randomly or in a precise pattern onto the make layer. The make layer is then cured at least sufficiently to retain the abrasive particles for the application of a size layer. The size layer comprises a second binder precursor (which may be the same as or different from the make layer binder precursor), and is applied over the make layer and abrasive particles. The second binder precursor is then cured (and, if necessary, the make layer is further cured alone or in combination with the size layer) sufficiently to make a useful coated abrasive article.

In another method, coated abrasive articles according to the present invention can be made by applying a layer of a slurry comprising binder precursor and abrasive particles onto at least a portion of a major surface of a backing. The slurry layer is then cured sufficiently to make a useful coated abrasive article.

Desirably, make, size and/or slurry layers are actinic radiation curable and are cured by actinic radiation.

Methods for applying make, size, and/or slurry layers to the backing, and applying optional backsize layers, tie layers, supersize layers, presize layers, or saturants are well known in the art and include, for example, roll coating (e.g., using soft rubber rolls), curtain coating, transfer coating, gravure coating, spraying, knife, die coating. Abrasive layers may be applied to the backing in a uniform or patterned manner, and may be continuous or discontinuous.

Desirably, if utilizing binder precursors comprising solid components, such precursors may be prepared by mixing some or all of the various ingredients of a binder precursor in a suitable vessel at an elevated temperature, for example, less than about 60° C., sufficient to liquify the materials so that they may be efficiently mixed, with stirring, to form the binder precursor, but without thermally degrading them (e.g., causing premature gelling).

Binder precursors utilized in practice of the present invention may be cured by exposure to thermal energy, such as heat or infrared radiation. Exemplary sources of thermal energy include ovens, heated rolls, infrared lamps, etc.

Desirably, binder precursors utilized in practice of the present invention are curable by actinic radiation and are cured by exposure to actinic radiation. In such cases, curing of the binder precursor typically begins upon exposure of the binder precursor to an appropriate source of actinic radiation, and may continue for a period of time thereafter. The energy source is selected for the desired processing conditions and to appropriately activate any optional photoinitiator and/or optional photocatalyst. Exemplary useful sources of ultraviolet and visible radiation include mercury, xenon, carbon arc, tungsten filament lamps, and sunlight. Ultraviolet radiation, especially from a medium pressure mercury arc lamp or a microwave driven H-type, D-type, or V-type mercury lamp, such as of those commercially available from Fusion UV Systems, Gaithersburg, Md., is especially desirable.

Exposure times may range, for example, from less than about 1 second to 10 minutes or more, desirably providing a total energy exposure from about 0.1 to about 10 Joules per square centimeter ($J/cm^2$) depending upon the amount and the type of reactants involved, the energy source, web speed, the distance from the energy source, and the thickness of the make layer to be cured. Filters and/or dichroic reflectors may be used to reduce thermal energy that accompanies the actinic radiation.

Coated abrasive articles according to the present invention can be converted, for example, into belts, tapes, rolls, discs (including perforated discs), and/or sheets. For belt applications, two free ends of the abrasive sheet may be joined together using known methods to form a spliced belt. A spliceless belt may also be formed as described, for example, in U.S. Pat. No. 5,573,619 (Benedict et al.), the disclosure of which is incorporated herein by reference.

The second major surface of the backing opposite the abrasive layer may be secured to a refastenable layer. For example, a refastenable layer may be secured (e.g., heat laminated or adhesively secured to the backing). The refastenable layer may be secured to the backing prior to the application of the make layer precursor or alternatively, for example, the refastenable layer may be secured to the backing after the application of the abrasive layer.

The refastenable layer may comprise a plurality of hooks or loops (e.g., fiber loops), typically in the form of a sheet-like substrate having a plurality of hooks or loops protruding from the back side of the substrate. The hooks or loops provide a means of engagement between the coated abrasive article and a support pad that contains a complimentary hook or loop surface.

The refastenable layer may also comprise a stem web as described, for example, in U.S. Pat. No. 5,672,186 (Chesley et al.), the disclosure of which is incorporated herein by reference.

Coated abrasive articles according to the present invention are useful for abrading a workpiece. One such method includes the step of frictionally contacting a coated abrasive article with a surface of the workpiece, and moving at least one of the coated abrasive article or the workpiece relative to the other to abrade at least a portion of the surface. Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Coated abrasive articles according to the present invention may be used by hand and/or used in combination with a machine. At least one or both of the coated abrasive article and the workpiece is moved relative to the other when abrading.

In another aspect, abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

The present invention will be more fully understood with reference to the following nonlimiting examples in which all parts, percentages, ratios, and so forth, are by weight unless otherwise indicated.

EXAMPLES

Unless otherwise noted, all reagents used in the examples were obtained, or are available from, general chemical suppliers such as Aldrich Chemical Co., Milwaukee, Wis., or may be synthesized by known methods.

The following abbreviations are used in the examples:

"ACR-1" refers to trimethylolpropane triacrylate having the trade designation "TMPTA-N", obtained from UCB Chemical Corp.;

"AMOX" refers to di-t-amyl oxalate, which can be prepared by esterification of oxalic acid with t-amyl alcohol as described in Example 11 of U.S. Pat. No. 4,904,814 (Frei et al.), the disclosure of which is incorporated herein by reference;

"BCP" refers to A-weight coated paper, obtained from Kimberly-Clark, Inc., Neenah, Wis., under the trade designation "SPECIFICATION 5316PO GOLD";

"CHDM" refers to 1,4-cyclohexanedimethanol, obtained from Eastman Chemical Co., Kingsport, Conn.;

"CPI-1" refers to a 50 weight percent solution of triarylsulfonium hexafluoroantimonate in propylene carbonate having the trade designation "UVI-6974", available from Dow Chemical Co.;

"CTI-1" refers to a quaternary ammonium hexafluoroantimonate, having the trade name "NACURE XC-7231", available from King Industries, Inc.;

"EPR-1" refers to a cycloaliphatic epoxide resin (average epoxy functionality of 2), having the trade designation "CYRACURE UVR-6110", available from Dow Chemical Co.;

"EPR-2" refers to a Bisphenol-A epichlorohydrin based epoxy resin having an epoxy equivalent weight of 525–550 grams/equivalent (g/eq), an average epoxy functionality of 2, and having the trade designation "EPON 1001F", available from Resolution Performance Products;

"EPR-3" refers to a Bisphenol-A epoxy resin having an epoxy equivalent weight of 172–179 g/eq, an average epoxy functionality of 2.2, and having the trade designation "DER 331", available from Dow Chemical Co.;

"FRPI-1" refers to 2-hydroxy-2-methyl-1-phenyl-1-propanone having the trade designation "DAROCUR 1173", obtained from Ciba Specialty Chemicals;

"FRPI-2" refers to (2,4,6-trimethylbenzoyl) diphenylphosphine oxide photoinitiator having the trade designation "LUCIRIN TPO", available from BASF Chemicals Corp., Ludwigshafen, Germany;

"FRPI-3" refers to benzophenone, available from Sartomer Company;

"FRPI-4" refers to a 1:1 mixture by weight of (2,4,6-trimethylbenzoyl)diphenylphosphine oxide and 2-hydroxy-2-methyl-1-phenyl-1-propanone obtained under the trade designation "DAROCUR 4265", obtained from Ciba Specialty Chemicals;

"FRPI-5" refers to 2,2-dimethoxy-1,2-diphenyl-1-ethanone which is a photoinitiator having the trade designation "IRGACURE 651", obtained from Ciba Specialty Chemicals;

"PC-1" refers to η-[xylenes (mixed isomers)]η-cyclopentadienyliron(II) hexafluoroantimonate, which can be prepared according to methods as described, for example, in U.S. Pat. No. 5,059,701 (Keipert), the disclosure of which is incorporated herein by reference;

"PER-1" refers to a high molecular weight hydroxy-terminated, saturated, linear, semi-crystalline copolyester under the trade designation "DYNAPOL S1227", obtained from Creanova, Piscataway, N.J.;

"SiC 400" refers to ANSI grade 400 silicon carbide, obtained from 3M Company, St. Paul, Minn.;

"VE-1" refers to 1,4-cyclohexanedimethanol divinyl ether under the trade designation "RAPI-CURE CHVE", obtained from Morflex.

All parts, percentages and ratios in the examples are by weight unless stated otherwise.

Test Procedures

The following test procedures were used to evaluate resin compositions and coated abrasive articles of the present invention.

Stroke Sanding Test (Stiction, Cut, Ra, Rz)

Specimens (4.5 inch (11 cm) by 5.5 inch (14 cm)) of the abrasive material to be tested were prepared and weights recorded. The specimens were placed into a bucket containing warm water (25 to 30° C.) and soaked in the warm water for 10–20 minutes prior to testing. Test panels utilized were clean black base coat/clear coat painted cold rolled steel panels (E-coat: ED5000; Primer: 764–204; Base coat: 542AB921; Clear coat: K8010A), obtained from ACT Laboratories, Hillsdale, Mich. The weights of the test panels (i.e., before abrading) were recorded.

For each measurement, a water soaked specimen was securely mounted, with the abrasive layer exposed, to a backup rubber sanding block having a sanding face of 2.8 inches (7.0 cm) by 4.9 inches (12 cm). The mounted specimen was dunked into the bucket, and the abrasive surface was placed in frictional contact with the surface of the test panel. The workpiece was manually abraded with the wetted mounted specimen in stroke cycles of 15, 15, and 20 double strokes (i.e., forward and backward). While abrading the test panel, a pressure of 4 to 6 psi (28 to 41 kiloPascals) was applied to the wetted mounted specimen. The wetted mounted specimen was dunked in the bucket of warm water between cycles. Additional dunking of the test specimen into the bucket of warm water was conducted as necessary to maintain relative movement of the specimen against the workpiece during the test.

Cut Measurement

The abraded surface of the test panel was dried. The difference between the initial (i.e., before abrading) weight and the final (i.e., after abrading) weight of the dried test panel was reported as "cut". Reported cut values represent an average of test results for 3 specimens.

Stiction Measurement

Stiction was determined according to the following rating scale (a rating of 1 corresponds to negligible stiction and a rating of 10 corresponds to very high stiction):

| | |
|---|---|
| 1 rating: | Slid easily through all 50 double strokes, negligible resistance felt. |
| 2–6 rating: | No extra water dunking through all 50 strokes, some resistance felt (2 was lower resistance and 6 was higher resistance). |
| 7 rating: | Increased resistance felt toward the end of each cycle (i.e., 15, 15, 20 double strokes), but the cycle could be completed. |
| 8 rating: | One or two additional water dunkings were required during the test to maintain relative movement of the specimen against the workpiece during the test. |
| 9 rating: | Three to five additional water dunkings were required during the test to maintain relative movement of the specimen against the workpiece during the test. |
| 10 rating: | More than five additional water dunkings were required during the test to maintain relative movement of the specimen against the workpiece during the test. |

Reported stiction values represent an average of test results for 3 specimens.

Surface Finish Measurement (Ra and Rz)

Ra is a common measure of roughness used in the abrasives industry. Ra is the arithmetic mean of the departures of the roughness profile from the mean line. Ra was measured with a profilometer probe, which was a diamond tipped stylus, at five locations and the arithmetic mean was calculated as the average of these five measurements. In general, the lower the Ra value was, the smoother or finer the surface finish of the workpiece. The results were recorded in micrometers. The profilometer was obtained under the trade designation "SURTRONIC 3" from Rank Taylor Hobson Co., Leicester, England.

Rz is a common measure of roughness used in the abrasives industry. Rz is defined as the Ten Point Roughness Height which is the average of the five greatest vertical peak-to-valley height differences within one cutoff length. Rz is measured with the same equipment as the Ra value. The results are recorded in micrometers. In general, the lower the Rz, the smoother the finish.

Ra and Rz were measured for dried abraded test panels. Reported Ra and Rz values represent an average of test results for 3 specimens.

Preparation of Size Resins

General Procedure for Preparing Size Resins: 29.1 grams of ACR-1 and 67.9 grams EPR-1 were mixed together at room temperature. With continued stirring, remaining ingredients as indicated in Table 1 (below) were dissolved into the mixture to resulting in a size coat.

TABLE 1

| COMPONENT | SIZE RESIN NO. | | | | | | | | | | | |
|---|---|---|---|---|---|---|---|---|---|---|---|---|
| (parts by weight) | 1 | 2 | 3 | 4 | 5 | 6 | 7 | 8 | 9 | 10 | 11 | 12 |
| EPR-1 | 67.9 | 67.9 | 67.9 | 67.9 | 68.25 | 68.6 | 68.25 | 67.9 | 67.9 | 67.9 | 0 | 67.9 |
| ACR-1 | 29.1 | 29.1 | 29.1 | 29.1 | 29.25 | 29.4 | 29.25 | 29.1 | 29.1 | 0 | 29.4 | 29.4 |
| VE-1 | 0 | 0 | 0 | 0 | 0 | 0 | 0 | 0 | 0 | 29.4 | 67.9 | 0 |
| CPI-1 | 3.0 | 2.0 | 3.0 | 3.0 | 1.5 | 0 | 3.0 | 4.0 | 0 | 3.0 | 3.0 | 3.0 |
| CTI-1 | 0.5 | 1.0 | 0.5 | 0.5 | 0.75 | 1.0 | 0 | 0 | 2.0 | 0.5 | 0.5 | 0.5 |
| FRPI-1 | 1.0 | 1.0 | 0 | 0 | 1.0 | 1.0 | 1.0 | 1.0 | 1.0 | 0 | 1.0 | 0 |
| FRPI-2 | 0 | 0 | 1.0 | 0 | 0 | 0 | 0 | 0 | 0 | 0 | 0 | 0 |

TABLE 1-continued

| COMPONENT | SIZE RESIN NO. | | | | | | | | | | | |
|---|---|---|---|---|---|---|---|---|---|---|---|---|
| (parts by weight) | 1 | 2 | 3 | 4 | 5 | 6 | 7 | 8 | 9 | 10 | 11 | 12 |
| FRPI-3 | 0 | 0 | 0 | 1.0 | 0 | 0 | 0 | 0 | 0 | 0 | 0 | 0 |
| FRPI-4 | 0 | 0 | 0 | 0 | 0 | 0 | 0 | 0 | 0 | 0 | 0 | 1.0 |

Examples 1–7 and Comparative Examples A–E

Examples 1–7 and Comparative Examples A–E were prepared according to the following procedure:

A make resin consisting of EPR-3 (35.8 parts by weight), AMOX (0.6 part by weight), ACR-1 (14 parts by weight), CHDM (2.8 parts by weight), EPR-2 (25.2 parts by weight), PER-1 (20 parts by weight), FRPI-5 (1 part by weight), and PC-1 (0.6 part by weight) was prepared as follows:

EPR-3, ACR-1, and CHDM were placed into a container. The mixture was then placed into a water bath having a temperature in the range of from 50 to 75° C. while mixing. FRPI-5, AMOX, and PC-1 were then added with mixing. The resulting mixture (premix) was then placed in a liquid feeder and mixed with the EPR-2 and PER-1 pellets in a twin-screw extruder. FRPI-5 and PC-1 were then added with constant stirring until the make resin was thoroughly mixed.

The make resin was die extrusion coated onto BCP coated paper at a nominal coating weight of 11 grams per square meter (g/m$^2$). The coated paper was then passed at a line speed of 30 meters per minute under a Fusion UV Systems 600 watts per inch (236 watts per centimeter) V-bulb operating at 85 percent power (nominal UVA dosage was 0.5 Joule per square centimeter (J/cm$^2$)). Next, SiC 400 grade abrasive particles were coated onto the make layer at a nominal coating weight of 21 g/m$^2$, and the web was passed under three radiant infrared heaters, obtained from Glenro Co., Paterson, N.J., at a nominal web temperature setting of 140° C. for 7.3 seconds.

Size resins as indicated in Table 2 (below) were applied to the above abrasive coated paper at a coating weight of 12 g/m$^2$ using a laboratory roll coater made by Eagle Tool Co. (Minneapolis, Minn.).

The size coated paper was then passed at a line speed of 50 meters per minute under a Fusion UV Systems 600 watts per inch (236 watts per centimeter) D-bulb (nominal UVA dosage was 0.5 J/cm$^2$). The material was subsequently thermally cured at 140° C. for 5 minutes to provide an abrasive sheet.

The abrasive sheets were evaluated according to the Off-hand Wet Abrasion Test described above. Results are listed in TABLE 2 (above).

Various modifications and alterations of this invention will become apparent to those skilled in the art without departing from the scope and spirit of this invention, and it should be understood that this invention is not to be unduly limited to the illustrated embodiments set forth herein.

What is claimed is:

1. A coated abrasive article comprising:
   a backing having a major surface;
   an abrasive layer secured to at least a portion of the major surface, the abrasive layer comprising a binder and abrasive particles; and
   reaction product of components comprising:
      polyfunctional acrylate;
      polyfunctional cationically polymerizable material; and
      ternary curative,
   wherein, optionally, the binder comprises at least a portion of the reaction product.

2. A coated abrasive article according to claim 1, wherein the abrasive layer comprises a make layer and a size layer at least partially covering the make layer.

3. A coated abrasive article according to claim 2, wherein the make layer comprises at least a portion of the reaction product.

4. A coated abrasive article according to claim 2, wherein the size layer comprises at least a portion of the reaction product.

5. A coated abrasive article according to claim 2, wherein polyfunctional cationically polymerizable material comprises at least one of polyepoxide or polyfunctional vinyl other.

6. A coated abrasive article according to claim 2, wherein polyfunctional cationically polymerizable material comprises polyepoxide.

7. A coated abrasive article according to claim 6, wherein ternary curative comprises at least one of an alpha-cleavage photoinitiator or benzophenone derivative.

8. A coated abrasive article according to claim 6, wherein ternary curative comprises triarylsulfonium salt selected

TABLE 2

| | EXAMPLE NO. | | | | | | | COMPARATIVE EXAMPLE LETTER | | | | |
|---|---|---|---|---|---|---|---|---|---|---|---|---|
| | 1 | 2 | 3 | 4 | 5 | 6 | 7 | A | B | C | D | E |
| Size Resin Used | 1 | 2 | 3 | 4 | 5 | 11 | 12 | 6 | 7 | 8 | 9 | 10 |
| TEST RESULTS | | | | | | | | | | | | |
| Stiction | 8 | 7.5 | 5.5 | 6.5 | 8 | 8 | 7.5 | 5.5 | 3.5 | 6 | 5.5 | 5 |
| Cut, grams | 1.50 | 1.29 | 1.17 | 1.24 | 1.28 | 1.26 | 1.16 | 1.27 | 1.20 | 1.35 | 1.29 | 1.19 |
| $R_a$, micrometers | 23 | 19 | 19 | 17 | 20 | 20 | 16 | 16 | 24 | 19 | 20 | 20 |
| $R_z$, micrometers | 140 | 115 | 117 | 113 | 128 | 119 | 106 | 139 | 133 | 122 | 119 | 119 | from the group consisting of (4-thiophenoxyphenyl) diphenylsufonium salts or triphenylsulfonium salts.

9. A coated abrasive article according to claim 6, wherein ternary curative comprises (4-methoxybenzyl) dimethylphenylammonium hexafluoroantimonate.

10. A coated abrasive article according to claim 6, wherein the coated abrasive article further comprises at least one of a backsize layer, tie layer, supersize layer, presize layer, or saturant.

11. A coated abrasive article according to claim 10, wherein at least one of the backsize layer, tie layer, supersize layer, presize layer, or saturant comprises at least a portion of the reaction product.

12. A coated abrasive article according to claim 6, wherein the backing comprises one of a polymeric substrate having hooking stems projecting therefrom, or a loop fabric.

13. A coated abrasive article according to claim 2, wherein ternary curative comprises photoinitiator comprising at least one of an alpha-cleavage photoinitiator or benzophenone derivative.

14. A coated abrasive article according to claim 2, wherein ternary curative comprises triarylsulfonium salt selected from the group consisting of (4-thiophenoxyphenyl)diphenylsulfonium salts or triphenylsulfonium salts.

15. A coated abrasive article according to claim 2, wherein ternary curative comprises (4-methoxybenzyl) dimethylphenylammonium hexafluoroantimonate.

16. A coated abrasive article according to claim 2, wherein the coated abrasive article further comprises at least one of a backsize layer, tie layer, supersize layer, presize layer, or saturant.

17. A coated abrasive article according to claim 16, wherein at least one of the backsize layer, tie layer, supersize layer, presize layer, or saturant comprises at least a portion of the reaction product.

18. A coated abrasive article according to claim 2, wherein the backing comprises one of a polymeric substrate having hooking stems projecting therefrom, or a loop fabric.

19. A coated abrasive ankle according to claim 1, wherein the abrasive layer comprises a slurry layer comprising a binder and abrasive particles.

20. A coated abrasive article according to claim 19, wherein the polyfunctional cationically polymerizable material comprises at least one of polyepoxide or polyfunctional vinyl ether.

21. A coated abrasive article according to claim 19, wherein the polyfunctional cationically polymerizable material comprises polyepoxide.

22. A coated abrasive article according to claim 21, wherein ternary curative comprises photoinitiator comprising at least one of an alpha-cleavage photoinitiator or benzophenone derivative.

23. A coated abrasive article according to claim 21, wherein ternary curative comprises triarylsulfonium salt selected from the group consisting of (4-thiophenoxyphenyl)diphenylsulfonium salts or triphenylsulfonium salts.

24. A coated abrasive article according to claim 21, wherein ternary curative comprises (4-methoxybenzyl) dimethylphenylammonium hexafluoroantimonate.

25. A coated abrasive article according to claim 21, wherein the coated abrasive article further comprises at least one of a backsize layer, tie layer, supersize layer, presize layer, or saturant.

26. A coated abrasive article according to claim 25, wherein at least one of the backsize layer, tie layer, supersize layer, presize layer, or saturant comprises at least a portion of the reaction product.

27. A coated abrasive article according to claim 21, wherein the backing comprises one of a polymeric substrate having hooking stems projecting therefrom, or a loop fabric.

28. A coated abrasive article according to claim 19, wherein ternary curative comprises photoinitiator comprising at least one of an alpha-cleavage photoinitiator or benzophenone derivative.

29. A coated abrasive article according to claim 19, wherein ternary curative comprises triarylsulfonium salt selected from the group consisting of (4-thiophenoxyphenyl)diphenylsulfonium salts or triphenylsulfonium salts.

30. A coated abrasive article according to claim 19, wherein ternary curative comprises (4-methoxybenzyl) dimethylphenylammonium hexafluoroantimonate.

31. A coated abrasive article according to claim 19, wherein the coated abrasive article further comprises at least one of a backsize layer, tie layer, supersize layer, presize layer, or saturant.

32. A coated abrasive article according to claim 31, wherein at least one of the backsize layer, tie layer, supersize layer, presize layer, or saturant comprises at least a portion of the reaction product.

33. A coated abrasive article according to claim 19, wherein the backing comprises one of a polymeric substrate having hooking stems projecting therefrom, or a loop fabric.

34. A coated abrasive article according to claim 19, wherein ternary curative comprises photoinitiator comprising at least one of an alpha-cleavage photoinitiator or benzophenone derivative.

35. A method for making a coated abrasive article comprising:
    providing a backing having a major surface;
    applying a make layer comprising a first hinder precursor onto at least a portion of the major surface of the backing;
    at least partially embedding a plurality of abrasive particles into the make layer;
    curing the first binder precursor;
    applying a size layer comprising a second binder precursor onto at least a portion of the make layer and plurality of abrasive particles; and
    curing the second binder precursor to provide a coated abrasive article, wherein said method includes incorporating a reaction product of components comprising:
    polyfunctional acrylate;
    polyfunctional cationically polymerizable material; and
    ternary curative,
into said coated abrasive article, and wherein, optionally, at least one of the first or second binder comprises cc least a portion of the reaction product.

36. A method according to claim 35, wherein the make layer comprises at least a portion of the reaction product.

37. A method according to claim 35, wherein the size layer comprises at least a portion of the reaction product.

38. A method according to claim 35, wherein the polyfunctional cationically polymerizable material comprises at least one of polyepoxide or polyfunctional vinyl ether.

39. A method according to claim 35, wherein the polyfunctional cationically polymerizable material comprises polyepoxide.

40. A method according to claim 35, wherein the coated abrasive article further comprises at least one of a backsize layer, tie layer, supersize layer, presize layer, or saturant.

41. A method cording to claim 40, wherein at least one of the backsize layer, tie layer, supersize layer, presize layer, or saturant comprises at least a portion of the reaction product.

42. A method according to claim 35, wherein ternary curative comprises (4-methoxybenzyl)dimethylphenylammonium hexafluoroantimonate.

43. A method for making a coated abrasive article comprising:
   providing a backing having a major surface;
   applying a slurry comprising a binder precursor and abrasive particles onto at least a portion of the major surface of the backing; and
   curing the binder precursor to provide a coated abrasive article,
   wherein said method includes incorporating at reaction product of components comprising:
   polyfunctional acrylate;
   polyfunctional cationically polymerizable material; and
   ternary curative,
into said coated abrasive article, and wherein, optionally, the cured binder precursor comprises at least a portion of the reaction product.

44. A method according to claim 43, wherein the cured binder precursor comprises the reaction product.

45. A method according to claim 43, wherein the polyfunctional cationically polymerizable material comprises at least one of polyepoxide or polyfunctional vinyl ether.

46. A method according to claim 43, wherein the polyfunctional cationically polymerizable material comprises polyepoxide.

47. A method according to claim 43, wherein the coated abrasive article further comprises at least one of a backsize layer, tie layer, supersize layer, presize layer, or saturant.

48. A method of abrading a workplace comprising:
   providing a coated abrasive article comprising:
      a backing having a major surface;
      an abrasive layer secured to at least a portion of the major surface, the abrasive layer comprising a make layer comprising a first binder and abrasive particles; and
      a size layer comprising a second binder at least partially covering the abrasive layer;
   wherein the coated abrasive article comprises a reaction product of:
      polyfunctional acrylate;
      polyfunctional canonically polymerizable material; and
      ternary curative,
   and wherein, optionally, at least one of the first or second binders comprises at least a portion of the reaction product;
   frictionally contacting at least a portion of the abrasive layer with at least a portion of the surface of the workpiece; and
   moving at least one of the coated abrasive article or the workpiece relative to the other to abrade at least a portion of the surface.

49. A method of abrading a workpiece comprising:
   providing a coated abrasive article comprising:
      a hacking having a major surface;
      an abrasive layer secured to at least a portion of the major surface, the abrasive layer comprising a slurry layer comprising a binder and abrasive particles,
   wherein the coated abrasive article comprises a reaction product of:
      polyfunctional acrylate;
      polyfunctional cationically polymerizable material; and
      ternary curative,
   and wherein, optionally, the binder comprises at least a portion of the reaction product
   frictionally contacting at least a portion of the abrasive layer with at least a portion of the surface of the workpiece; and
   moving at least one of the coated abrasive article or the workpiece relative to the other to abrade at least a portion of the surface.

\* \* \* \* \*

UNITED STATES PATENT AND TRADEMARK OFFICE
CERTIFICATE OF CORRECTION

PATENT NO. : 6,773,474 B2
DATED : August 10, 2004
INVENTOR(S) : Koehnle, Gregory A.

Page 1 of 1

It is certified that error appears in the above-identified patent and that said Letters Patent is hereby corrected as shown below:

Title page,
Item [56], References Cited, FOREIGN PATENT DOCUMENTS, "EP 0 284 062 A2"
Should read -- EP 0 284 064 A2 --.

Column 10,
Line 47, delete "dimethlamino" and insert in place thereof -- dimethylamino --

Column 20,
Line 43, delete "other" and insert in place thereof -- ether --.

Column 21,
Line 2, delete "diphenylsufonium" and insert in place thereof -- diphenylsulfonium --.
Line 40, delete "ankle" and insert in place thereof -- article --.

Column 22,
Line 36, delete "hinder" and insert in place thereof -- binder --.
Line 53, delete "cc" and insert in place thereof -- at --.

Column 23,
Line 1, delete "cording" and insert in place thereof -- according --.
Line 16, delete "at" and insert in place thereof -- a --.
Line 36, delete "workplace" and insert in place thereof -- workpiece --.

Column 24,
Line 7, delete "canonically" and insert in place thereof -- cationically --.
Line 21, delete "hacking" and insert in place thereof -- backing --.

Signed and Sealed this

Twenty-second Day of March, 2005

JON W. DUDAS
*Director of the United States Patent and Trademark Office*